Dec. 14, 1937. S. FERBEND 2,101,989
MIXING APPARATUS AND JUICE EXTRACTOR
Filed Feb. 10, 1937 2 Sheets-Sheet 1
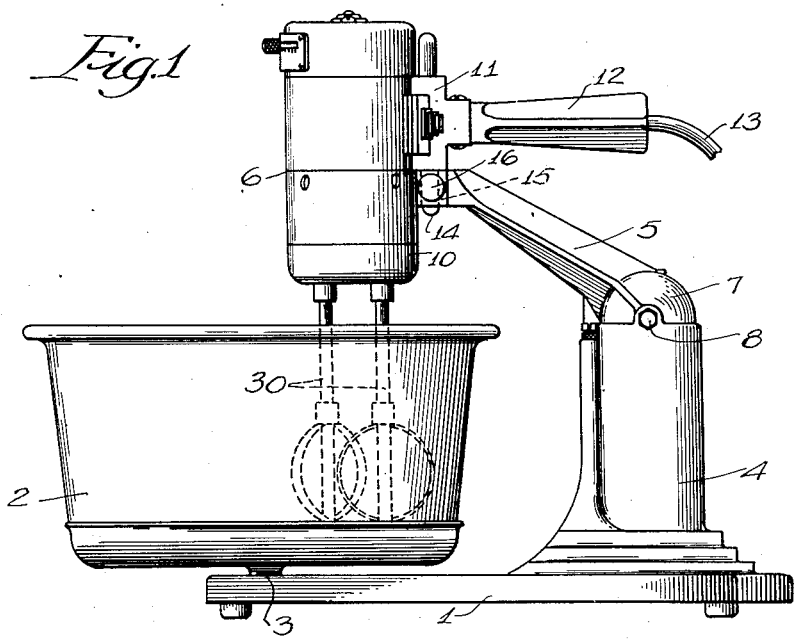
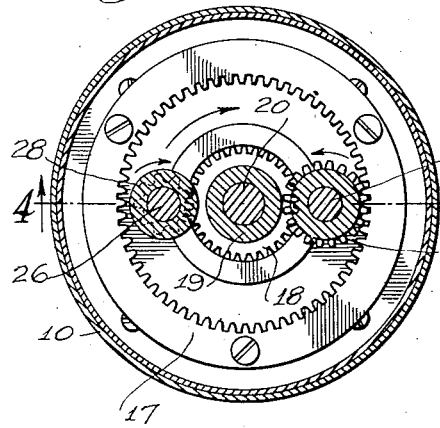
Inventor:
Spencer Ferbend,
By Fisher, Clapp, Soans & Pond
Attorneys Dec. 14, 1937. S. FERBEND 2,101,989
MIXING APPARATUS AND JUICE EXTRACTOR
Filed Feb. 10, 1937 2 Sheets-Sheet 2
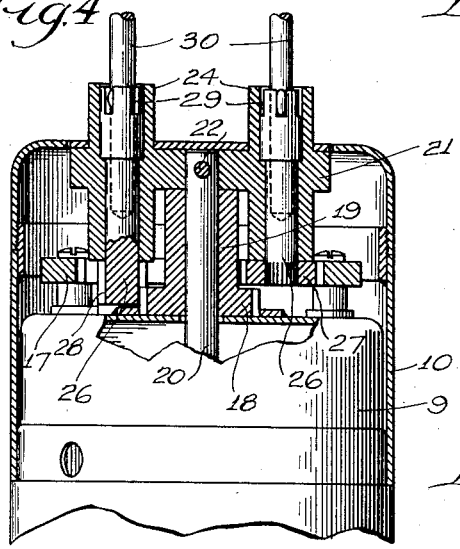
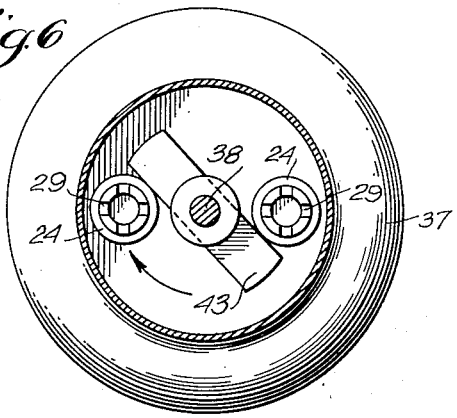
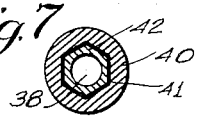
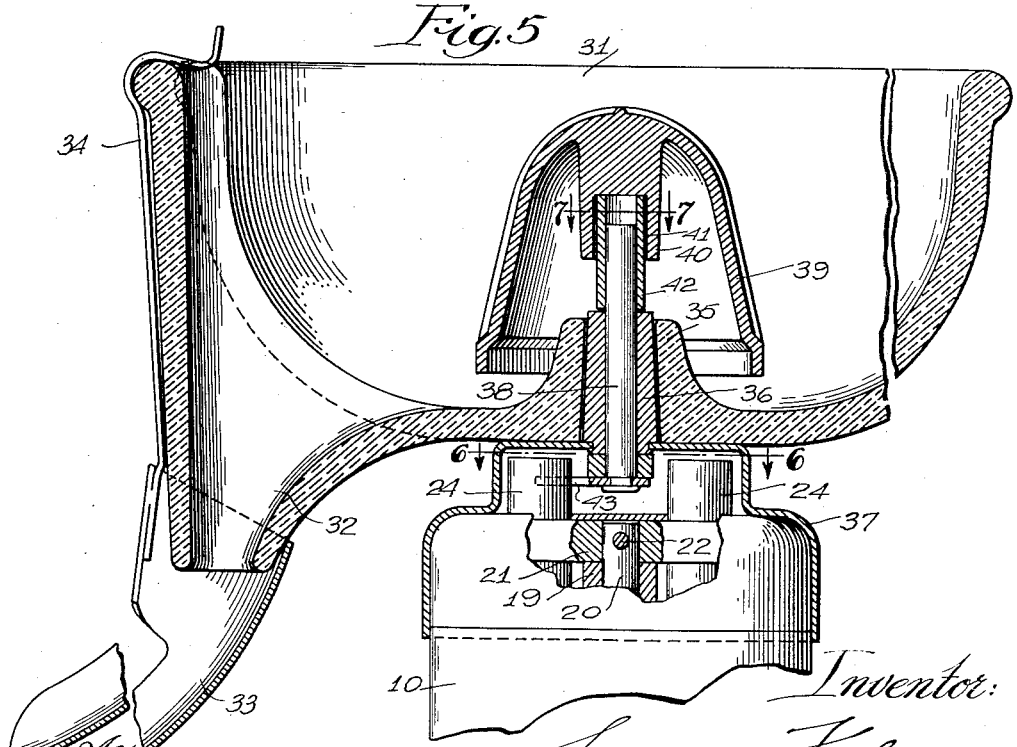
Inventor: Spencer Ferbend,
By Fisher, Clapp, Soans & Pond,
Attorneys.

Patented Dec. 14, 1937

2,101,989

UNITED STATES PATENT OFFICE 2,101,989

MIXING APPARATUS AND JUICE EXTRACTOR

Spencer Ferbend, Chicago, Ill., assignor to Chronmaster Electric Corporation, Chicago, Ill., a corporation of Illinois Application February 10, 1937, Serial No. 124,963

3 Claims. (Cl. 259—84)

This invention relates to mixing and agitating machines for food and drinks and more particularly to electrically driven portable mixing machines of the type employing a plurality of agitators or beaters.

The main objects of this invention are to provide a mixing machine of this kind having improved mechanism for actuating the agitators; to provide improved mechanism of this kind which is also adapted to operate a juice extractor or other attachment when the agitators are removed; and to provide an improved mixing machine of this kind having a bowl adapted to be rotated by the agitators through the resistance of the material acted upon.

An illustrative embodiment of this invention is shown in the accompanying drawings, wherein:—

Figure 1 is a side elevation of a food mixer to which this invention is applied.

Figure 2 is an enlarged fragmentary perspective, partly in section, of the motor and its housing.

Figure 3 is a transverse section taken on the line 3—3 of Fig. 2.

Figure 4 is a section taken on the line 4—4 of Fig. 3.

Figure 5 is a fragmentary view partly in section and partly in elevation showing a juice extractor attached to the motor in place of the agitator shafts.

Figures 6 and 7 are transverse sections taken on the lines 6—6 and 7—7, respectively, of Fig. 5.

In the construction illustrated in Figure 1, the improved mixing machine comprises a base 1 having a removable mixing bowl 2 rotatably mounted thereon, as by means of a suitable bearing 3.

On one end of the base 1, is an upright bracket 4, on which is hinged an arm 5 which supports a motor unit 6.

The lower end of the arm 5 has a ball-shaped bearing part 7 which is pivotally secured to the upper end of the bracket by a pin 8.

The motor unit 6 comprises an electric motor 9 housed within a substantially cylindrical casing 10 provided with a bracket 11 to which is secured a handle 12 through which the electric conductor 13 passes. The handle bracket 11 has a pin 14 which is seated in a socket 15 in the outer end of the arm 5 and which is clamped to the arm by a set screw 16.

Fixed on one end of the motor housing, is an internal ring gear 17. Also fixed on the same end of the motor housing, is a stationary gear 18 concentric with but laterally offset from the gear 17 and having a hub 19 which serves as a stationary bearing for a shaft 20 which is driven by the motor. The outer end of the shaft carries a rotatable head 21 which is fastened to the shaft by a pin 22 or other suitable fastening means. A face plate 23 covers the outer face of the head.

Formed on the head 21, is a pair of external bosses 24 alined with internal bosses 25 to provide journals for a pair of spindles 26 which are located on diametrically opposite sides of the shaft 20. Mounted on the inner ends of the spindles, are planet pinions 27 and 28 which mesh respectively with the stationary gears 17 and 18 so that, when the shaft 20 and head 21 are rotated by the motor, the spindles will be rotated in respectively opposite directions on their own axes and will also be caused to rotate as a unit through a circular path around the axis of the shaft.

Formed in the outer ends of the spindles, are sockets 29 for receiving a pair of agitators or beaters 30 which are adapted to extend into the bowl.

From an examination of Fig. 1, it will be seen that the spindles and shaft are located in a vertical plane which is disposed radially of the bowl and the axis of the bowl is located outside of the orbit traversed by the beaters so that the bowl will be rotated through the friction of the material acted upon by the beaters.

Referring to Figs. 5, 6, and 7, the device is also adapted for use as a juice extractor by backing off the set screw 16 and then raising and inverting the motor unit from its position as shown in Fig. 1.

The juice extractor herein illustrated includes a bowl 31 having a spout 32 to which is attached a removable extension 33 having a clip 34 which engages the rim of the bowl. Formed in the center of the bowl, is a hollow upstanding boss 35 which is adapted to fit around a sleeve or bushing 36 which is mounted on a cap 37 which is adapted to fit over one end of the casing 10 when the beaters are removed and the motor unit 6 inverted from the position shown in Fig. 1.

Journaled in the bushing 36, is a spindle 38, on the upper end of which is detachably secured a juice extracting element 39 having a hub 40 provided with a hexagonal socket 41 for receiving a hexagonal sleeve 42 which is fixed on the shaft.

On the lower end of the spindle 38, is fixed a crank arm 43 which is adapted to be engaged by one of the bosses 24 for operatively connecting the spindle 38 with the rotating head 21.

The spindle 38 may also be used for driving many other implements as will be well understood.

Although but one specific embodiment of this invention has been shown and described, it will be understood that details of the construction shown may be altered without departing from the spirit of the invention as defined by the following claims:

I claim:

1. In a device of the class described, the combination of a casing, an electric motor and motor housing mounted in said casing, a shaft driven by said motor, a rotatable head fast on said shaft, a pair of spindles journaled on said head, both of said spindles being parallel with and equi-distant from said shaft and located at diametrically opposite points of said head, agitators fast on said spindles, planetary pinions fast on said spindles, a gear fast on the motor housing with which one of said pinions meshes, and an internal ring gear concentric with said first named gear fast on the motor housing and located in a plane laterally offset from the plane of said first named gear with which the other of said pinions meshes, whereby, as said head is rotated, said spindles are moved bodily in a common orbit and are rotatable in opposite directions on their own axes.

2. In a device of the class described, the combination of a casing, an electric motor and motor housing mounted in said casing, a shaft co-axial with and driven by said motor, a flat rotatable head fast on the outer end of said shaft, said head having diametrically opposed bearing bosses equi-distant from said shaft and each extending beyond both sides of said head, a pair of spindles respectively journaled in said bosses, both of said spindles being parallel with said shaft, agitators detachably mounted on said spindles, planetary pinions fast on said spindles, a gear fast on the motor housing with which one of said pinions meshes, said gear having a hub forming a bearing for said shaft, and an internal ring gear concentric with said first named gear fast on the motor housing and located in a plane laterally offset from the plane of said first named gear, whereby, as said head is rotated, said spindles are moved bodily in a common orbit and are rotated in opposite directions on their own axes.

3. In a device of the class described, the combination of a casing, an electric motor in said casing, a rotatable head in said casing driven by said motor, said head having an upstanding projection disposed eccentrically of the axis of rotation of said head, a removable stationary cap fitting over one end of said casing, a juice extractor bowl seated on said cap, the bottom wall of said bowl being formed with a hollow upstanding boss, a bearing sleeve mounted on said cap and extending into said boss, a spindle journaled in and extending below said sleeve, a juice extractor mounted on the upper end of said spindle, and a crank arm on the lower end of said spindle driven by said projection as said head is rotated.

SPENCER FERBEND.